Figure 1:
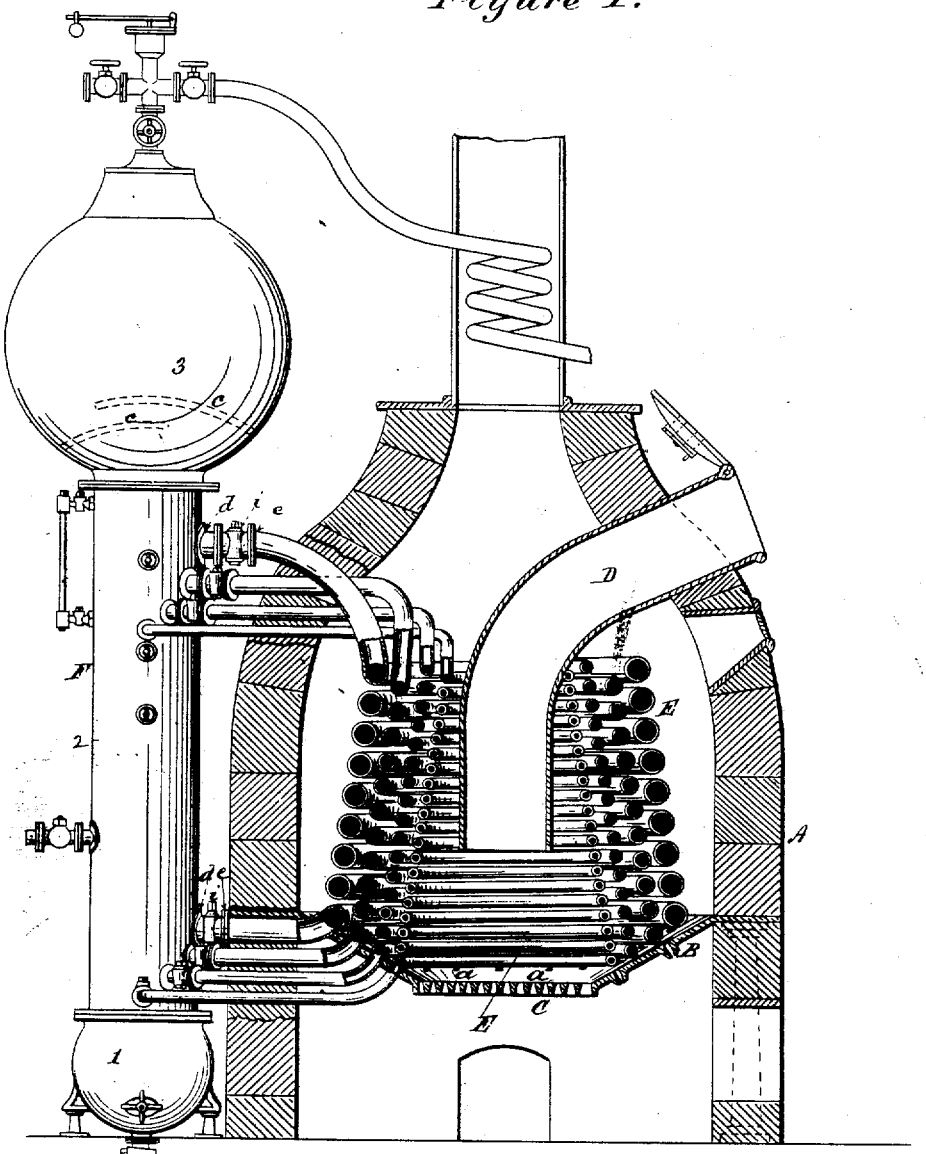

122. LIQUID HEATERS & VAPORIZERS,
Water tube, Coil, Vertical,
Central magazine.

251

2 Sheets—Sheet 1.

M. M. MONSANTO,

Assignor, by mesne assignments, to himself and B. ODIO and F. PEROZO.

STEAM GENERATOR AND FURNACE.

No. 10,174. Reissued Aug. 1, 1882.

Witnesses:
Wm. A. Pollock.
Geo. H. Evans

Inventor:
Mauricio M. Monsanto
By his attorney,
E. N. Dickerson Jr.

N. PETERS, Photo-Litho, Washington, D. C.

122. LIQUID HEATERS & VAPORIZERS,
Water tube, Coil, Vertical,
Central magazine.

251

2 Sheets—Sheet 2.

M. M. MONSANTO,

Assignor, by mesne assignments, to himself and B. ODIO and F. PEROZO.

STEAM GENERATOR AND FURNACE.

No. 10,174. Reissued Aug. 1, 1882.

Witnesses:
Wm. A. Pollock
Geo. H. Evans

Inventor:
Mauricio M. Monsanto,
By his attorney,
E. N. Dickerson

N. PETERS, Photo-Lithographer, Washington, D. C.

UNITED STATES PATENT OFFICE.

MAURICIO M. MONSANTO, OF NEW YORK, ASSIGNOR, BY MESNE ASSIGNMENTS, TO HIMSELF AND BENJAMIN ODIO, OF NEW YORK, AND FELIPE PEROZO, OF BROOKLYN, N. Y.

STEAM-GENERATOR AND FURNACE.

SPECIFICATION forming part of Reissued Letters Patent No. 10,174, dated August 1, 1882.

Original No. 235,275, dated December 7, 1880. Application for reissue filed June 6, 1882.

*To all whom it may concern:*

Be it known that I, MAURICIO M. MONSANTO, of New York city, State of New York, and a citizen of the United States of Colombia, South America, have invented a new and Improved Steam-Generator and Furnace; and I do hereby declare that the following is a full, clear, and exact description thereof, which will enable others skilled in the art to which my invention appertains to make and use the same, reference being had to the accompanying drawings, forming part of this specification.

My invention has for its object the improvement in the construction of steam generators and boilers for the distillation of liquids in evaporating brines and saccharine liquids and similar applications of heat, as well as improvements in the construction of furnaces and combustion-chambers for burning pulverized fuel, bituminous or coking coals, from which, in becoming incandescent, large quantities of gases are thrown off, and, mingled with the proper supply of atmospheric air, burst into flame, and are then employed for generating steam. It will also be found valuable where anthracite and semi-bituminous and cannel coals are used, and by slight alteration of the grate it can be adapted to burn the various hydrocarbons and other gases.

A further object is to provide an improved setting and arranging of the flues and passages of such boilers and furnaces, and to automatically provide, on the base-burning plan, for the feeding of fuel so as to obtain the best results from the fuel consumed, all of which will be hereinafter more fully described. Besides producing a perfect combustion of the fuel, the object is to absorb and utilize for the generation of steam the heat generated by the fuel in the most effective manner, by exposing all the heat-absorbing surface to the greatest intensity of the heat generated, by providing for a perfect circulation of the liquid to be evaporated, by which means a constant supply of water must be in contact with the heating or heat-absorbing surface, and by guiding the products of combustion in such a way that they impinge at angles against the heating-surface.

Figure 2:
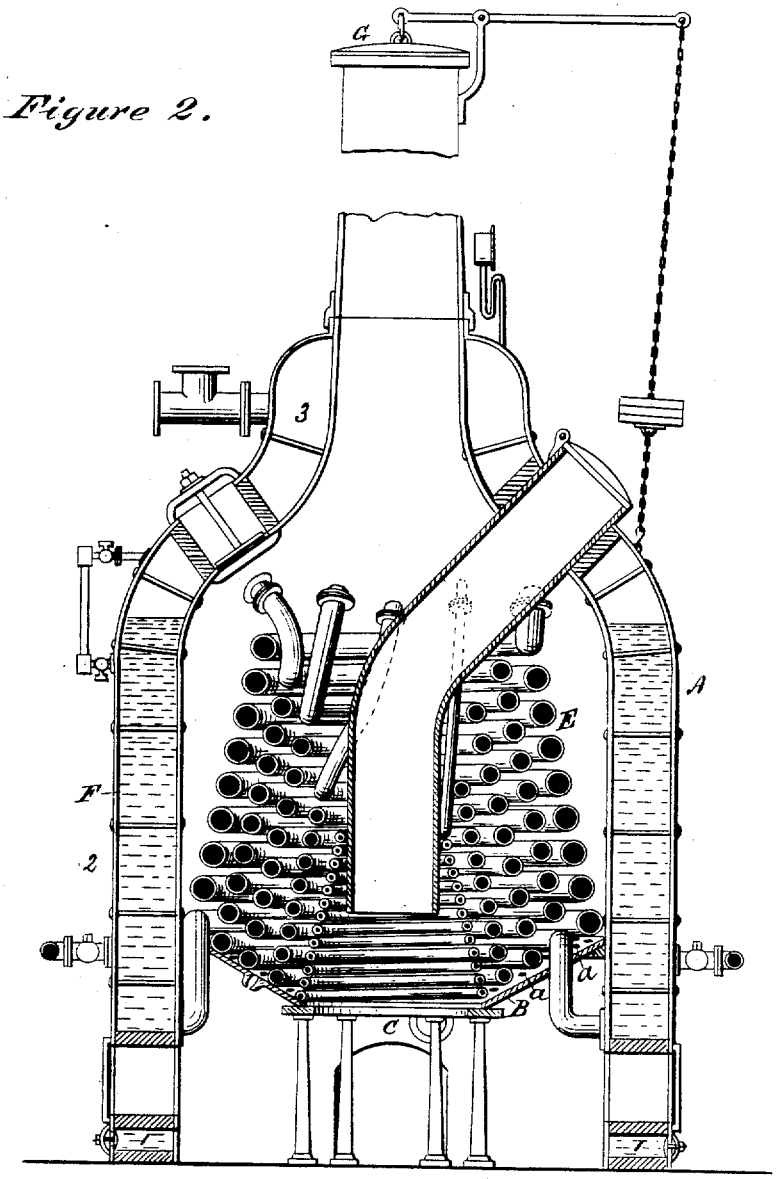

In the drawings, Figure 1 represents a vertical longitudinal section of my improved coil steam-generator furnace, mud-drum, steam-dome, and stand-pipe. Fig. 2 shows a modification, but substantially embodying the same general principles.

Before proceeding to describe my invention in detail I will remark that it is generally understood, as a rule, the particles entering with the feed-water are small, the steam generated beneath them in common boilers balloons them to the surface of the water, where the steam will be liberated and the particles will descend, and the impalpable particles, by their subsidence upon the boiler-plates, concrete into scale. The effect of this incrustation on the heating-surface is that in proportion to the amount of solid matter accumulated, combined with the non-conductive property, so will the evaporation be retarded. As before stated, the incrustation formed by the water commonly used is almost a non-conductor of heat, the soluble matter held in suspension is precipitated to the surface of the boiler plate or flues, and thus pitting, burning, and oxidation of the boiler-plate are the result. Now, with my construction of water-coil boiler I produce a rapid circulation through the coils, the velocity of which brushes and keeps clean their internal surface, the water in its passage carrying the calcareous matter into the mud-drum. Thus the accumulation of calcareous deposit on the inner surface of the tubes is entirely avoided.

With reference to my furnace, I have proceeded upon the well-established theory that perfect combustion within a furnace must of necessity obviate the wasteful discharge therefrom of combustible matter, whether solid or gaseous, and that with a high degree of combustion no smoke is produced. To attain these ends I employ well-known elements, which have heretofore been combined and arranged in various ways, and with other novel features I make use of some of these elements and arrangements with relation to each other, as will more particularly appear in my claims.

In the drawings, where such letters of reference are used, A is the outer shell, of masonry or fire-brick.

B are the inclined supports for the water-coils, forming concave sides within the furnace and convex on the outer or ash-pit side. This plate B may be perforated, as shown at *a*, for the supply of hundreds of minute jets of heated air to the fuel in the furnace. The perforations are preferably made flaring or funnel shape; or the plate may be cast with nipples on its under side for the purpose of giving additional heat to the air on its passage to the combustion-chamber. These nipples may be cast in bulbs, as shown at *a'*, forming an air-cell within them. Should these perforations become choked up, they may be blown out or cleared by any well-known means.

C shows the grate of ordinary construction; but it is evident that a plate adapted to the kind of fuel to be used may be substituted, and if hydrocarbon be used as fuel, then of course burners for that purpose will be provided.

The furnace-chamber shown in the drawings is of a somewhat conoidal shape, but may be square or of other form to suit location. While this furnace is capable of being supplied with fuel through an ordinary door, I prefer to feed it on the base-burning principle. By feeding the fuel from the top, as shown at D, I avoid the frequent opening of the door and its well-known bad effects. By thus feeding from the top the fuel is automatically fed, the feeder forming a retort by which the fuel is partially coked and brought to the best condition for its nearer perfect combustion. The gases extracted by the coking process force themselves down through the fuel, and on their escape, and with the combustible gases arising from the fuel on the furnace proper, take circuitous courses between the water-coils until they meet the hundreds of jets of air passing through the perforations in the plate, the coils being so arranged that the air enters between them, when the air and gases become intimately mixed and burst into flames. It is evident that any other construction of boiler-tubes may be located within this furnace-chamber. After the furnace has been a short time in operation the walls reach a very high temperature, and, owing to the peculiar shape of the roof, the gases upon their ascent impinge against its sides, which are up to an extreme heat. Now, should there be any unconsumed inflammable gases they are immediately ignited, and their heat, combined with that of the walls, is reflected or radiated back on the surface to be heated. Thus it will be seen that this furnace takes the character and produces the result of a reverberatory furnace.

The grates or perforated plates may be supported in any well-known manner.

The ordinary ash and air-supply doors are provided. An air-blast, or steam and air combined, could be used with this furnace with good results.

Pulverized fuel—such as coal-dust or slack—may be burned on the inclined side grates, while lump-coal may be burned on the center grate, or both at the same time, if so desired.

When slow combustion is desirable, or when the draft is to be regulated or entirely shut off, the damper G is put in operation. It may be operated by levers, chain and weights, or any automatic device, preferably by pressure of steam in the boiler. By this means I am enabled to control the combustion of the fuel in the furnace and increase or diminish the intensity of heat, as may be required.

E represents a nest of water-coils, concentrically arranged and located centrally around the grate. These coils rest on the inclined perforated plate, and extend well up into the combustion-chamber, encircling the coal-reservoir. These coils E increase in diameter from the inner one to the outer, and rise spirally and conically from their base, and terminate about two-thirds the height of the furnace-chamber. They are arranged so as to break joints in the interstices between the coils, thus retarding and compelling the flame and the heat to remain longer in contact with the steam-generating surface, and also compelling the flame to take a zigzag course, causing it to impinge on all sides of the surface to be heated.

Upon the outside of the furnace is located a stand-pipe, F, provided at its lower end with an enlarged mud-drum and on its summit a steam-drum. This stand-pipe is preferably made in sections 1 2 3, except when a small apparatus is used. Then it may be cast in one piece. It may be provided with the usual manholes and hand-holes. The upper section, 3, which forms the steam-dome, has near its intersection with the middle portions of the stand-pipe steam and water separators *c*. When the saturated steam is ascending into said dome it is caused to impinge against these separators, the water in it adhering to their surfaces and the steam escaping to its proper chamber. On the upper and lower ends of the middle section, 2, of the stand-pipe are placed flanged projections *d*, as many as there are coils of pipe in the furnace. Each of said water-coils E has two ends, one above and one below. These ends project through the side walls of the furnace, and are also provided with coupling-flanges *e'*. Between these flanges *d* and *e* are placed stop-cocks *i*, both above and below. The object of these stop-cocks is to make each individual coil of pipe a separate generator, so that there may be two or more, as may be required; but the principal object is to cut off the supply of water from each coil, if such coil becomes disabled from any cause.

It is obvious that any or either of the coils may be removed and replaced when such is found expedient.

The mud-drum 1 is made much larger than the body of the stand-pipe for the purpose of providing a large reservoir for a body of water. It is well known that when the water is kept in an agitated state the sediment is constantly kept moving, and will continue so until the boiler is cooled off, when it settles on the inner surface of the tubes or plates; but when a body of water in a quiescent state is in communication with the water in an agitated state the sediment or foreign substance precipitates to where the water is quiet, and thus the water circulating through the coils is kept comparatively clean.

Should the steam in the steam-dome be not as dry as may be necessary, it may be conveyed to a superheater located in the chimney or uptake.

The superheater may be of any approved pattern; but I have shown a coil, or when said coil is not used for a superheater it may be used for heating the feed-water. I thus utilize the waste heat passing off to the atmosphere.

The mouth of the fuel-reservoir may be provided with a lid or cover, and it may have in it an air-register to supply, if desired, a quantity of air to pass down with the gases into the furnace.

It is evident that all the various boiler-attachments—such as gages, feed apparatus, blow-off, &c.—may be applied to the stand-pipes or to the water-space, as shown in Fig. 2.

In the modifications shown by Fig. 2 the principles, arrangement of parts, and mode of operation are precisely the same, except that the outer shell forms a water and steam space and takes the place of the stand-pipe. I prefer to feed the water to the shell at four or more points of its circumference.

It will be observed that my apparatus possesses unusual facilities for examination and repair, together with extreme simplicity and firmness of joints; that they are all outside and not exposed to the heat. The firm and tight joints of coils or of sectional boilers are, after all, the great desideratum. Thus I have practical simplicity, by which I produce the desired effect—viz., rapid generation of steam, rapid circulation of the water in the coils, the prevention of incrustation in the boiler, and facilities of repair and great saving in the first cost.

Having described my invention, its construction, and operation, what I claim as new, and desire to secure by Letters Patent, is—

1. The inclined fire-supporting bed-plate B, surrounding the grate and provided with perforations and downwardly-projecting perforated lugs, in combination with and supporting the coils, as set forth.

2. In a circulating or coil boiler, the nest consisting of a series of concentric coils arranged spirally and conically, and located centrally within shell A, combined with and extending to the plate B and around the grate, each communicating with an outside chamber and encircling and extending below the fuel-magazine to the grate, substantially in the manner and for the purpose set forth.

3. In a circulating-coil steam generator, a series of independent coils rising spirally and conically from a perforated plate surrounding the grate, arranged so that the air from the perforated plate passes up between them, said coils being of different diameters, and the coils being independently connected to a stand-pipe and provided with separate stop-cocks, by means of which each or any of them may be disconnected from said stand-pipe or removed in the manner and for the purpose set forth.

4. The combination, with a water coil steam-generator, of the stand-pipe provided with flanged projections, each arranged to connect with a separate and independent section of water-coil and of different diameters, the mud-drum 1, arranged below the coil-connections and communicating directly with the stand-pipe and enlarged for the purpose of retaining the water in a quiescent state, whereby the sediment is carried from all the coils to the drum and there caused to precipitate in the manner and for the purpose shown.

5. The combination, in a water-coil steam-generator, of the coils varying in diameters, for the purpose shown, the stand-pipe F, provided with enlarged mud-drum 1, central section, 2, provided with upper and lower flanged projections and the steam-section 3, forming the steam-dome, said dome being provided with the steam and water separators *e*, all operating and arranged in the manner set forth and described.

6. The combination, in a circulating-coil boiler, of a grate, a perforated plate surrounding the same, and a series of vertically-arranged concentric coils extending downward to the perforated plate, substantially as described.

7. The combination of a series of concentric coils surrounding the combustion-chamber and extending downward to the perforated plate and an independent stand-pipe or circulating-reservoir, the said coils being connected with said stand-pipe above and below, but the upper connection being below the water-level in said stand-pipe, substantially as shown and described.

8. In a circulating-coil boiler, the combination of a series of concentric tubes surrounding the combustion chamber and an exterior stand-pipe, the said coils being each independently connected above and below and with the stand-pipe, and each being provided with stop-cocks or valves at both ends, cutting off communication with the stand-pipe, substantially as described.

MAURICIO M. MONSANTO.

Witnesses:

GEO. H. EVANS,

ANTHONY GREF, Jr.